Oct. 24, 1939.  E. GERHARD  2,177,061
OBJECT DETECTING SYSTEM
Filed Aug. 19, 1936
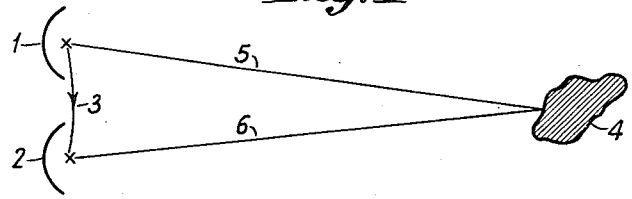
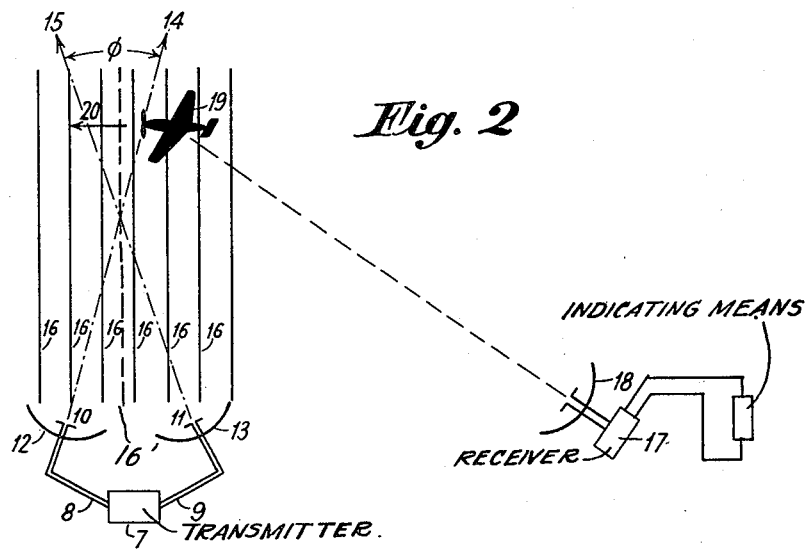
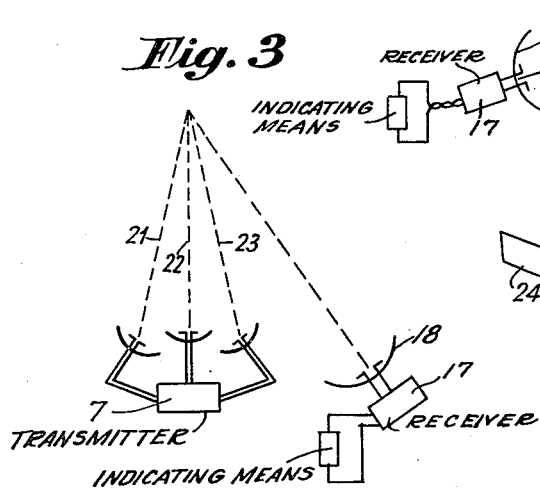
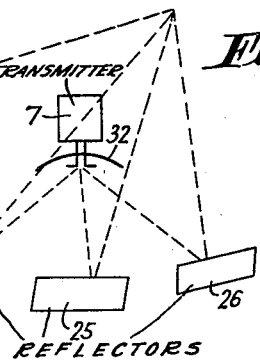
INVENTOR
ERNST GERHARD
BY
ATTORNEY Patented Oct. 24, 1939

2,177,061

UNITED STATES PATENT OFFICE 2,177,061

OBJECT DETECTING SYSTEM

Ernst Gerhard, Berlin, Germany, assignor to Telefunken Gesellschaft für Drahtlose Telegraphie m. b. H., Berlin, Germany, a corporation of Germany Application August 19, 1936, Serial No. 96,803
In Germany August 19, 1935

4 Claims. (Cl. 250—1)

This invention relates to a system for indicating the presence of a moving object in space and has more particularly to do with a device of this character which performs its function by virtue of the formation of an interference pattern between the several ones of a plurality of radiated beams of energy so that as the object itself moves across different zones of interference it will reflect first a summation of the energies from two different transmitters and then as it moves into a zone of interference where the energies of two beams are in phase opposition the amplitude of the reflected wave is substantially reduced to zero.

My invention will be more fully described by reference to the accompanying drawing in which Fig. 1 shows diagrammatically an arrangement of a transmitter and a receiver, each having beam focussing means connected thereto and showing the paths of two beams, one as it impinges upon a moving object, and the other as it is reflected therefrom;

Fig. 2 shows more in detail an arrangement of a receiver, and two beam radiators connected to a transmitter as used in carrying out my invention;

Fig. 3 shows a modification of the invention in which three transmitters are employed for producing in space an interference pattern with limited areas of interference; and Fig. 4 shows still another modification in which the transmitter is provided with reflecting means for aiming the beams of energy into space in such manner that intersecting cones of energy are formed.

Hitherto the following method of indicating the presence of moving objects by means of electro-magnetic waves, has been suggested: An ultra-short wave transmitter 1 (see Fig. 1) and a directive receiver 2 are arranged within a short distance. The receiver 2 receives a part of the modulated waves coming directly from 1, for instance across path 3, and a further part following the reflection thereof on the object 4 arriving across the path 5—6. In accordance with the position of the object 4, the phase of the radiation directly received and that of the radiation received after reflection are the same or in opposition, and if movement of the object 4 takes place, there occur periodical variations in the volume of the received signals.

At greater distances of the reflecting body 4, this method can no longer be applied, partly because the radiation originating at the transmitter 1 does not remain a single wave radiation, and further because the frequency of the waves is not apt to be constant.

The present invention avoids these drawbacks. The method is substantially independent of the frequency variations, and of reflections from the Kennelley-Heaviside layer. In accordance with the invention, in the space to be checked up in place of a homogeneous electro-magnetic field, as was hitherto required, an interference field is produced. When movement of a reflecting object takes place in this interference field, a periodic change of the receiving volume can be observed in the receiver.

Figures 2 to 4 show examples of arrangements according to the invention.

In Fig. 2, an ultra-short wave generator 7 is connected to the two dipoles 10 and 11 across the two power lines 8 and 9. The rays are concentrated by the two parabolic reflectors 12 and 13, and projected in the directions 14 and 15 respectively as indicated by dash lines. If the directions 14 and 15 of the two ray beams are not parallel, an interference field appears having zones of higher and lower field strength as indicated by the lines 16 in the drawing. The receiver 17 together with the parabolic reflector 18 are disposed within any desired distance from the transmitter 7. Now, if a reflecting object 19 moves within the interference field, more or less power will be periodically reflected upon the receiver 17. The position of the central interference band 16' is independent of the length of the waves produced by the transmitter 7. But the distance between the individual interference stripes varies in proportion to the wave length. This is due in fact that the angle $\phi$ formed by the axes of the two beams 14 and 15 remains constant. Hence small variations in the wave length are practically without significance in carrying out the method. The arrangement according to Fig. 2 provides for indicating the movement of the object 19, only under the condition that a component of the direction of movement lies transverse to the zones 16; say in the direction of the arrow 20. If the direction of movement is such that the object remains in one zone, then the desired indication of motion would not be given.

This disadvantage, however, is avoided in the modification shown in Fig. 3. Use is made of three beams of rays sent out in directions 21, 22, 23 so as to enclose a space angle. Such an arrangement produces an interference field, a cross section of which is made up of triangles.

According to Fig. 4, three ray cones are produced respectively by each of three reflecting surfaces 24, 25 and 26 radiated from the directional transmitter 32.

In this method ultra-short electrical waves are preferably utilized since they readily afford a sharp concentration and sufficiently small distances between the individual interference areas.

I claim:

1. Apparatus for indicating the presence of a moving object in space comprising a radio transmitter having means for propagating a plurality of directional beams, each beam being from a different one of a plurality of separated stations, the radiant energies of which are of the same frequency, said beams being so directed that their axes intersect one another thereby to form an interference pattern in space, in combination with receiving apparatus located remote from said object and having means for detecting differences in amplitude of waves reflected by said moving object, and means including a directional energy collector for causing said wave-amplitude-difference-detecting means to denote the movement of said object from a zone of additive intensity of the propagated beams to a zone of phase opposition of said beams.

2. Apparatus in accordance with claim 1 and having means for propagating at least three directional beams in such manner that their axes intersect one another to form a three-dimensional pattern of interference zones, said zones being such that when traversed by said moving object the intensity of the energy reflected by said object is varied in time relation to the passage of said moving object from zone to zone.

3. A system for indicating the presence and the movement of an object in space comprising a plurality of transmitting antennae spaced apart, a common source of radiant energy to be fed to said antennae, means for propagating said energy in a directional beam from each antenna, means for causing the axes of said beams to intersect one another, and to produce three-dimensional zones of interference of the radiant energy, a receiver located in the path of energy reflected by said object in space and means operable by said receiver for causing an indication to be made in response to variations in the intensity of the reflected energy, which variations are attributable to the movement of said object from a zone of energy phase agreement to a zone of energy phase opposition, or vice versa.

4. The method of detecting the presence of a moving object in space which comprises causing a plurality of radiant energy beams to be so propagated as to form an interference pattern in said space, receiving said energy after reflection from said moving object and at a point remote therefrom, reflecting a summation of the energies of said beams by the object itself as it moves across different zones of interference, and producing amplitude differences at the point of reception of the reflected energy, said differences being due to the alternate traversal by said reflecting object of zones wherein the energies of different beams are in phase agreement, and again wherein said energies are in phase opposition.

ERNST GERHARD.